Patented Aug. 5, 1952

2,606,190

UNITED STATES PATENT OFFICE 2,606,190

AMINO ETHYL ETHERS OF PYRIDYL CARBINOLS

Robert S. Shelton, Mariemont, and Charles H. Tilford, Silverton, Ohio, assignors to The Wm. S. Merrell Company, Cincinnati, Ohio, a corporation of Delaware No Drawing. Application June 8, 1948, Serial No. 31,827

6 Claims. (Cl. 260—294.7)

This invention relates to new products which are useful in combating, reducing or minimizing the physiological effects of histamine and other allergens, e. g., for the relief of hay-fever, asthma of allergenic origin, urticaria, and the like.

The new compounds of the invention are substituted 2-picolines in which the carbon atom attached to the pyridine ring in the 2-position is substituted by an amino-alkoxy or aminoalkylthio group and by a cyclic group, or is itself a part of a cyclic group, thus being represented by the formula

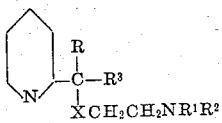

in which X represents oxygen or sulfur, $R^1$ and $R^2$ represents alkyl groups having not more than 3 carbon atoms or taken together form an alkylene chain having not more than 6 carbon atoms as in the case of the piperidine and pyrrolidine compounds, R represents hydrogen or an alkyl group having not more than 3 carbon atoms and $R^3$ is a cyclic group, such as phenyl, cyclohexyl or cyclohexenyl, or R and $R^3$ are joined in a cyclic structure including the 2-carbon as in the bornylidene, fenchylidene and indanylidene compounds.

The compounds are thus the ethers of β-tertiary-aminoethanols with carbinols of the formula

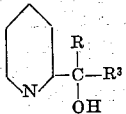

in which R and $R^3$ are so selected that the radical

contains at least 6 and not more than 10 carbon atoms and at least one carbocyclic radical which is either a carbocyclic radical linked to the carbon atom in the 2-position of the pyridine ring or includes that carbon atom in the ring structure, and the corresponding thioethers.

The new compounds are basic, and will ordinarily be used in the form of an acid addition salt, i. e., as the hydrochloride, hydrobromide, sulfate, succinate, phosphate, glycolate, acetate, tartrate, levulinate, or the like, by oral administration in the form of tables or other suitable form. The hydrochlorides and hydrobromides are white, crystalline materials. The free bases are distillable under vacuum and may be converted to the salts by simple neutralization with the required amount of acid, while the acid addition salts may be converted to the free base by treatment with caustic or carbonated alkali in the usual way.

The new products are conveniently prepared by heating the corresponding phenyl - (2-pyridyl)-carbinol or thiol with the corresponding amino-alkyl chloride or other salt in the presence of sodium, with purification of the free base product by distillation, or crystallization, or by conversion to a salt followed by crystallization. This will be illustrated by the following examples, but the invention is not limited thereto.

*Example I.*—α-(2 - dimethylaminoethoxy)-α-cyclohexyl-α-methyl-2-picoline.—A mixture of 12 grams of 30 mesh granular aluminum metal, 1 gram of mercuric chloride and 5 drops of mercury was heated to 125° C. for a few minutes. Then a mixture of 20 grams of pyridine and 20 grams of acetylcyclohexane (cyclohexyl methyl ketone) was added and the mixture was refluxed with stirring until a vigorous reaction took place. Then 230 grams of pyridine were added in one portion followed by the slow addition (1 to 2 hours) of 80 additional grams of acetylcyclohexane with stirring and refluxing being continued for about 12 hours. Most of the unchanged pyridine was removed by vacuum distillation, and the residue was taken up in 200 ml. of toluene. To this with stirring were added 72 grams of potassium hydroxide in 250 ml. of water. The aqueous layer was discarded, and the toluene solution was extracted with an excess of 10% hydrochloric acid. The aqueous extract was separated and made alkaline with 20% potassium hydroxide, after which the precipitated oil was extracted with toluene and fractionally distilled. Cyclohexyl-methyl-(2-pyridyl)-carbinol was collected at 118–122° C./0.1 mm. A sample was converted to the solid hydrochloride; M. P. 230° C. (dec.). 41 grams of this carbinol were dissolved in 375 ml. of toluene, and any water present removed by distillation until about 25 ml. of distillate was collected. To the refluxing solution was added 4.6 grams of freshly cut sodium with stirring until most of the sodium had reacted. Then 28 grams of β-dimethyl-aminoethyl chloride in 300 ml. of dry toluene were added over a period of an hour, followed by the addition of 1.2 grams of sodium.

The refluxing was continued for about 16 hours, after which the toluene solution was washed with 200 ml. of water and treated with 10% hydrochloric acid until acid to Congo red. Sufficient aqueous sodium bicarbonate solution was then added to make the solution alkaline to Congo red. This operation resulted in the unchanged carbinol remaining in the toluene layer, and the aminoether being extracted into the aqueous layer. The aqueous extract was made strongly alkaline with sodium carbonate, extracted with 200 ml. of petroleum ether, and the petroleum ether extract fractionally distilled. The aminoether was collected at 128–132° C./0.2 mm. The monohydrochloride melted at 164–165° C.

*Example II.—α-(2-dimethylaminoethoxy)-α-Δ₁ - cyclohexenyl - α - methyl - 2 - picoline.*—Δ₁-cyclohexenyl-methyl-(2-pyridyl)-carbinol was prepared in a manner similar to that employed in synthesizing the intermediate of Example I, in this instance using 22 grams of aluminum, 124 grams of acetyl-Δ₁-cyclohexene, and 300 ml. of pyridine. The carbinol was collected at 124–130° C./0.4 mm. The aminoether was obtained by a procedure similar to that of Example I using 18 grams of this carbinol, 2.1 grams of sodium, and 12 grams of β-dimethylaminoethyl chloride in 150 ml. of dry toluene. The desired product was collected at 138–142° C./0.2 mm. It formed a hygroscopic monohydrochloride; M. P. 136–138° C.

*Example III.—2 - [1 - (2 - dimethylaminoethoxy)-1-indanyl]-pyridine.*—1 - (2 - pyridyl) - 1 - indanyl alcohol, distilling at 140–144° C./0.3 mm. was prepared by the procedure of Example I, using α-hydrindone as the ketone. The hydrochloride melted at 154–156° C. This carbinol was converted by the etherification procedure of Example I to the aminoether, which distilled at 162–164° C./0.3 mm. The monohydrochloride melted at 137–139° C.

*Example IV.—2-[α-(2-dimethylaminoethoxy)-bornyl]-pyridine.*—α-(2-pyridyl) - bornyl alcohol was prepared by the procedure of Example I, using camphor as the ketone. The product was collected at 130–2° C./0.1 mm. The hydrochloride melted at 209–210° C. From this alcohol there was obtained by the etherification procedure of Example I the aminoether distilling at 134–138° C./0.2 mm. The melting point of the dihydrochloride was 146–148° C.

*Example V.—2 - [α - (dimethylaminoethoxy)-fenchyl]-pyridine.*—α-(2-pyridyl)-fenchylalcohol was obtained by the procedure of Example I using dl-fenchone as the ketone. The product was collected at 105–110° C./0.2 mm. M. P. 54–56° C. The hydrochloride melted at 200–202° C. (dec.). This carbinol (58 grams) was converted to the β-dimethylaminoethyl ether; B. P. 135–138° C./0.2 mm. by the procedure of Example I. The hydrochloride melted at 197–198° C.

The β-diethylaminoethyl ether prepared in the same way from β-diethylaminoethyl chloride had a B. P. of 150–56°/0.2 mm. and gave a hydrochloride melting at 192–94°.

*Example VI.—2[α-(dimethylaminoethoxy)-cyclohexyl]-pyridine.*—α-(2-pyridyl) - cyclohexanol was obtained by using cyclohexanone as the ketone in the procedure of Example I. It was collected at 140–145°/12 mm. Its hydrochloride melted at 157–59° C. corr. This carbinol was converted to the amino ether by the procedure of Example I to give the base of B. P. 139–42 C./1 mm. The hydrochloride had a M. P. of 163–164°.

*Example VII.—2 - [α-(2 - dimethylaminoethylthio) -α-methylbenzyl]-pyridine.*—A mixture of 60 grams of 2-(1-phenyl-vinyl)-pyridine and 63 grams of thioacetic acid was heated for 16 hours on the steam bath. The reaction mixture was then stirred with 200 ml. of a saturated sodium bicarbonate solution, extracted with benzene, and the benzene extract evaporated on the steam bath. The residue was dissolved in a 1 to 1 mixture of 40–60° petroleum ether and diethyl ether, cooled to −20°, and filtered. The thioacetate of phenyl-methyl-(2-pyridyl)-methanethiol was obtained as light yellow crystals melting at 96–98° C. A mixture of 36 grams of this acetate and 3.4 grams of sodium dissolved in 200 ml. of 99% ethanol was refluxed for 6 hours with stirring. The alcohol was removed by distillation, and the residue was stirred with 200 ml. of toluene and 30 ml. of water. The toluene layer was separated and fractionally distilled yielding a yellow oil distilling at 118–124° C./0.2 mm. The hydrochloride of this phenyl-methyl-(2-pyridyl)-methanethiol melted at 222–224° C. The aminothioether was prepared by the etherification procedure of Example I using 21 grams of this methanethiol. The product was collected at 162–166° C./0.1 mm. The monohydrochloride melted at 123–125° C.

*Example VIII.—α-(2 - dimethylaminoethoxy)-α-methyl-α-phenyl-2-picoline.*—To 40 parts of phenyl-methyl-(2-pyridyl)-carbinol in 240 parts of toluene were added 4.35 parts of sodium. The mixture was refluxed with stirring until all of the sodium had dissolved. Then at 60–70°, 17 parts of β-dimethylaminoethyl chloride in 160 parts of toluene were added during 30 minutes followed by refluxing for an equal period. A second 4.35 part portion of sodium was added; the mixture was refluxed 5 minutes; and 17 parts more of the dimethylaminoethyl chloride in toluene were added as above followed by refluxing for 3 hours. The mixture was washed with 100 parts of water and distilled. At 145–7°/1 mm., 12 parts of unchanged phenyl-methyl - (2 - pyridyl) - carbinol were collected; and at 156–9°/1 mm., 12 parts (40% based on recovered starting material) of the desired amino ether were obtained. Conversion to the hydrobromide gave a crystalline product which melted at 123–5° when recrystallized from butanone.

*Example IX.—α-(2 - dimethylaminoethoxy)-α-phenyl-2-picoline.*—To a mixture of 18.5 parts of phenyl-(2-pyridyl)-carbinol in 160 parts of xylene were added 2.3 parts of sodium. The mixture was refluxed with stirring for 6 hours; and at 60–70°, 15 parts of β-dimethylaminoethyl chloride in 160 parts of toluene were added during 30 minutes followed by refluxing for 3 hours. The solvent was removed by vacuum distillation. The residue was taken up in 80 parts of benzene and extracted once with 25 parts of 10% hydrochloric acid. The aqueous extract must have a pH higher than 8 or else some of the starting phenyl-pyridyl-carbinol will be extracted. The water was removed on the steam bath under vacuum and the residue was recrystallized under anhydrous conditions from butanone. The white crystalline hydrochloride obtained melted at 98–100° and was hygroscopic.

These compounds are highly effective as histamine antagonists, and are useful in the treatment of hay-fever, asthma, urticaria, and other ailments of the character associated with physiological reactants to histamine or the like, i. e., the so-called allergic responses or syndromes.

Other compounds included in the invention and useful for the same purposes include:

α-(Piperidinoethoxy)-α-methyl-α-cyclohexyl-2-picoline.
α-(Pyrrolidinoethoxy)-α-methyl-α-cyclohexyl-2-picoline.
α-(β-Dipropylaminoethoxy)-α-phenyl-2-picoline.
α-(β-Methylpropylaminoethoxy) - α - ethyl - α-phenyl-2-picoline.
α-(β-Dimethylaminoethoxy)-α-propyl - α - cyclohexenyl-1-picoline.

We claim:
1. Compounds of the formula

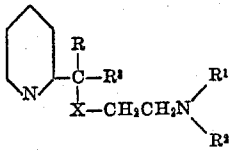

in which X is selected from the group consisting of oxygen and sulfur, R is selected from the group consisting of hydrogen and alkyl radicals having not more than 3 carbon atoms, $R^1$ and $R^2$ are selected from the group consisting of alkyl radicals having not more than 3 carbon atoms, and when taken together, form with the nitrogen to which they are attached a member selected from the group consisting of piperidino and pyrrolidino structures and $R^3$ is a member of the group consisting of phenyl, cyclohexyl, and cyclohexenyl radicals, with the proviso that when $R^3$ is phenyl X is sulfur.

2. α - (2 - dimethylaminoethoxy) - α - cyclohexyl-α-methyl-2-picoline.
3. α - (2 - dimethylaminoethoxy) - α - $\Delta_1$ - cyclohexenyl-α-methyl-2-picoline.
4. 2 - [α - (2 - dimethylaminoethylthio) - α - methylbenzyl]-pyridine.
5. α - (Piperidinoethoxy) - α - methyl - α - cyclohexyl-2-picoline.
6. α - (Pyrrolidinoethoxy) - α - methyl - α - cyclohexyl-2-picoline.

ROBERT S. SHELTON.
CHARLES H. TILFORD.

REFERENCES CITED

The following references are of record in the file of this patent:

UNITED STATES PATENTS

| Number | Name | Date |
|---|---|---|
| 2,397,799 | Martin et al. | Apr. 2, 1946 |

OTHER REFERENCES

J. Chem. Soc., 1939, 809–812.
Chemical Abstracts 35, 4771³, (1941) citing Rec. Trav. Chim, 59, 971–977 (1940).
Hartman, Calif. and Western Medicine 66, 242–248, (1947).